United States Patent
Engel et al.

(10) Patent No.: US 10,219,588 B2
(45) Date of Patent: Mar. 5, 2019

(54) BELT LOCK HOUSING

(71) Applicant: ILLINOIS TOOL WORKS INC., Glenview, IL (US)

(72) Inventors: Christian Engel, Ahlden (DE); Kai Wachlin, Hohenwestedt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 176 days.

(21) Appl. No.: 15/118,152

(22) PCT Filed: Feb. 11, 2015

(86) PCT No.: PCT/US2015/015327
§ 371 (c)(1),
(2) Date: Aug. 11, 2016

(87) PCT Pub. No.: WO2015/123245
PCT Pub. Date: Aug. 20, 2015

(65) Prior Publication Data
US 2017/0172261 A1 Jun. 22, 2017

(30) Foreign Application Priority Data
Feb. 12, 2014 (DE) .................. 10 2014 101 743

(51) Int. Cl.
*A44B 11/25* (2006.01)
*B60R 22/00* (2006.01)

(52) U.S. Cl.
CPC .......... *A44B 11/2546* (2013.01); *B60R 22/00* (2013.01)

(58) Field of Classification Search
CPC ............ A44B 11/2546; A44B 11/2561; A44B 11/2515; A44B 11/2576; A44B 11/2523; F16B 21/084; Y10T 34/4002; Y10T 24/4002; Y10T 29/49947; B60Q 3/233; B60Q 3/82; B60Q 3/242; B60Q 3/64;
(Continued)

(56) References Cited

U.S. PATENT DOCUMENTS 7,360,794 B2 * 4/2008 Kohama ............ A44B 11/2523
280/801.1
2005/0274203 A1 * 12/2005 Kaijala .................. B60R 22/18
73/862.391
(Continued)

FOREIGN PATENT DOCUMENTS

CN 103534887 A 1/2014
DE 102008030048 A1 12/2009
(Continued)

OTHER PUBLICATIONS

ISR and WO for PCT/US2015/015327 dated May 15, 2015.

*Primary Examiner* — Jack W Lavinder
(74) *Attorney, Agent, or Firm* — Martin J. Cosenza; Pilloff & Passino LLP

(57) ABSTRACT

A belt lock housing having a housing cover, a housing base and a plurality of connecting pins, which are fixed in receptacles in the housing cover, characterized in that the housing base is produced in a two-component injection molding process and has a first plastic component, which forms a shell of the housing base, and a second plastic component, which forms a reinforcing element of the housing base having the connecting pins.

21 Claims, 4 Drawing Sheets

Figure 1:
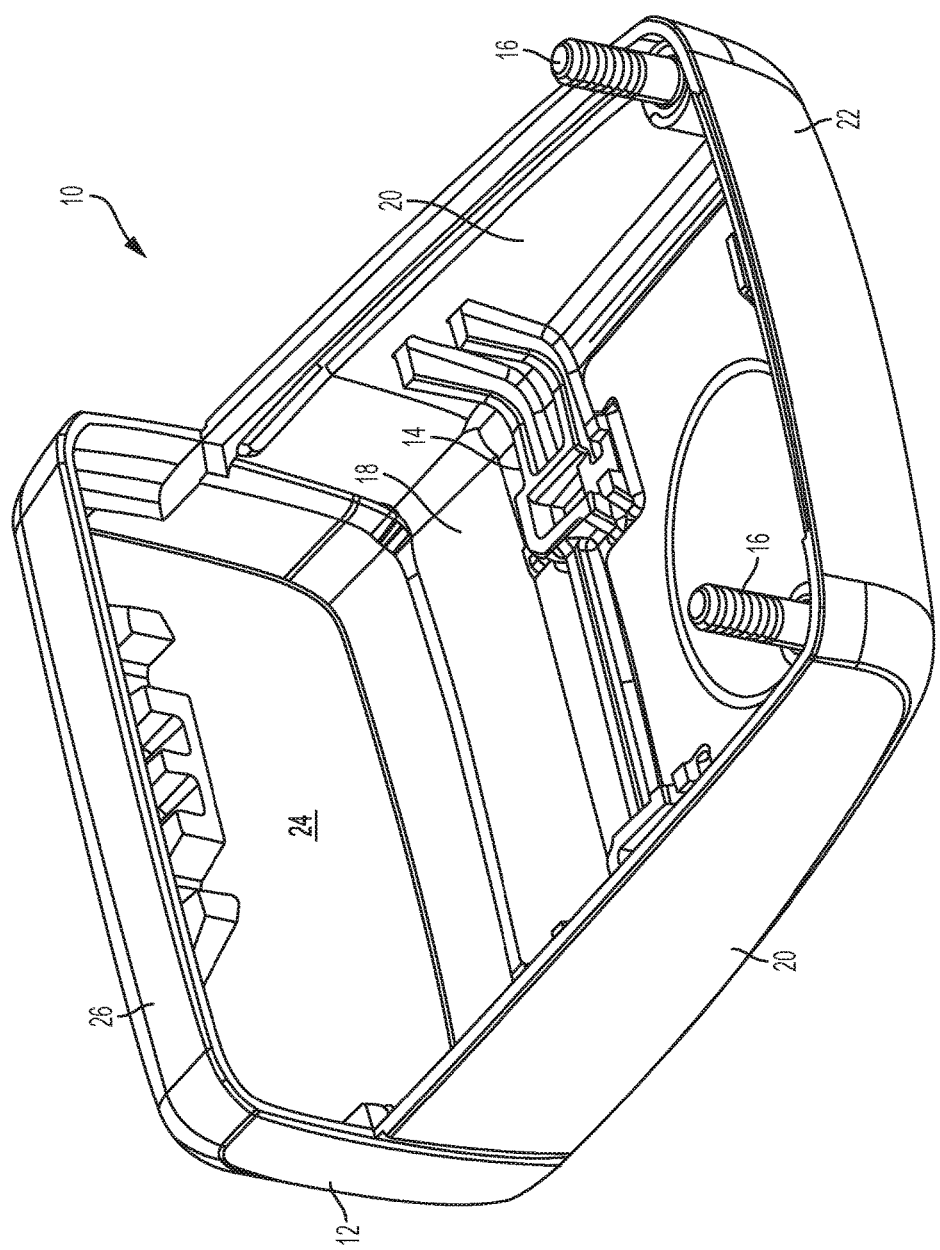

(58) Field of Classification Search
CPC ........... B60Q 3/80; B60R 22/12; B60R 22/00; B60R 22/18; B60R 2022/1806; F21V 23/0442
See application file for complete search history.

(56) References Cited

U.S. PATENT DOCUMENTS

2009/0324360 A1  12/2009  Schuech et al.
2014/0044475 A1  2/2014  Broemstrup et al.

FOREIGN PATENT DOCUMENTS

DE  102010021701 A1  6/2011
DE  102012200242 A1  7/2013

\* cited by examiner

BELT LOCK HOUSING

RELATED APPLICATIONS

The present application is a National Phase of International Application Number PCT/US2015/015327, filed Feb. 11, 2015, and claims priority to German Application Number 10 2014 101 743.9, filed Feb. 12, 2014.

The invention relates to a belt lock housing having a housing cover, a housing base and a plurality of connecting pins, which are fixed in receptacles in the housing cover.

Belt locks serve for putting on a seat belt, in particular in all types of motor vehicle. The belt locks have a belt lock mechanism which is arranged within the belt lock housing. A belt lock connector can be latched into the belt lock and fixed therein by a locking mechanism of the belt lock mechanism. Unlocking generally takes place by actuating an unlocking button on the belt lock. For reliable functioning that is satisfactory for many years, the belt lock housing has to have sufficient stability.

The document DE 10 2008 030 048 A1 has disclosed a belt lock housing having a housing cover and a housing base. Housing cover and housing base are connected to each other with the aid of two connecting pins made from steel. The connecting pins have a toothing and one half is in each case pressed into a bore in the housing cover and one half into a bore in the housing base.

The document DE 10 2010 021 701 A1 has disclosed a belt lock housing, the housing base and housing cover of which are likewise connected to each other via connecting pins made from metal. The connecting pins are pressed through a passage bore in the housing cover into a bore in the housing base and likewise have a toothing. In addition, the connecting pins have a head which bears against the outer side of the passage bore and remains visible from the outside.

The document DE 10 2012 200 242 A1 has disclosed a belt lock housing in which connecting pins having a head likewise connect a housing cover and a housing base to each other. The connecting pins are composed of metal and are inserted as inserts into an injection molding die and encapsulated with the plastic material of the housing cover by injection molding such that the head is arranged in the interior of the housing base.

Taking this as the starting point, it is the object of the invention to provide a belt lock housing of the type mentioned at the beginning which has high dimensional stability and can be manufactured simply and cost-effectively.

This object is achieved by the belt lock housing having the features of claim 1. Advantageous refinements are indicated in the adjoining dependent claims.

The belt lock housing has a housing cover, a housing base and a plurality of connecting pins, which are fixed in receptacles in the housing cover, wherein the housing base is produced in a two-component injection molding process and has a first plastic component, which forms a shell of the housing base, and a second plastic component, which forms a reinforcing element of the housing base having the connecting pins.

Housing cover and housing base can be two housing halves having dimensions of substantially equal size. The two housing halves can be designed in the form of half shells.

The connecting pins serve for connecting housing cover and housing base. They consist of the second plastic component and are formed integrally with the reinforcing element. The connecting pins project out of the shell of the housing base such that, when housing cover and housing base are joined together, said connecting pins can be inserted into receptacles provided for this purpose in the housing cover. In particular, they can be pressed into said receptacles, which can be formed as in particular bores in the manner of blind holes, such that they are fixed in a form-fitting manner in the housing cover. Any other suitable form of fixing, for example by means of adhesive bonding or latching, is also conceivable. In particular in the event of frictional fixing, the connecting pins can have a toothing.

In the invention, the housing base is produced in a two-component injection molding process using two different plastics. A first plastic component forms a shell of the housing base and, as a result, in particular determines the external appearance of the assembled belt lock housing. The housing cover can be produced from the same plastic material. The reinforcing element can be arranged in the shell of the housing base in such a manner that it is not visible from the outside when the belt lock housing is fitted.

The second plastic component forms a reinforcing element which has the connecting pins. Reinforcing element and connecting pins are therefore formed integrally and can be produced from the material of the second plastic component in a single injection operation. The reinforcing element can have a connecting piece which connects the two connecting pins to each other. The connecting piece can have one or more reinforcing and/or connecting ribs. The reinforcing element can be designed as a reinforcing frame, in particular with one or more struts which are arranged, for example, in the manner of a frame or framework. Alternatively, the reinforcing element can be designed as a reinforcing plate or reinforcing shell, in particular with a two-dimensional and/or entirely or partially closed structure.

By means of the single-part formation of the connecting pins with the reinforcing element, secure anchoring of the connecting pins in the housing base or in the shell of the housing base is obtained. At the same time, a precise arrangement of the connecting pins is achieved without a positioning step, which is complicated in terms of manufacturing, of premanufactured connecting pins being required for this purpose. The precise arrangement of the connecting pins simplifies the assembly of the belt lock housing and leads to a noticeable reduction in defective parts which are to be discarded. Furthermore, the reinforcing element leads to improved dimensional stability of the housing base and therefore of the entire belt lock housing.

In one refinement, for each of the connecting pins, the reinforcing body has an anchoring section which is arranged in an extension of the respective connecting pin and which is held in a form-fitting manner in the shell. In principle, it can be sufficient to connect the connecting pins to the shell via any elements of the reinforcing element. The anchoring sections which are held in a form-fitting manner in the shell and are in each case assigned to one of the connecting pins can increase the pull-out forces of the connecting pins. As an alternative or in addition, the anchoring sections can be anchored in an integrally bonded manner in the shell, which can take place during the injection molding when suitable plastic materials or material additives are used.

In one refinement, the anchoring section has a shank with at least one longitudinal section having widened cross-sectional dimensions. The shank can have smaller cross-sectional dimensions adjacent to the longitudinal section having widened cross-sectional dimensions and can be completely or virtually completely enclosed by the first plastic component of the shell. Particularly secure anchoring of the anchoring section in the shell is thereby obtained. For example, the anchoring section can be circular in cross section, and then the cross-sectional dimensions correspond to the respective diameters. Alternatively, the anchoring section can be angular in cross section, in particular tetragonal, pentagonal or hexagonal, or polygonal.

In one refinement, the reinforcing element has a first transverse strut, which connects two of the anchoring sections to each other. In principle, the reinforcing element can have any geometry which is sufficient for the arrangement of the connecting pins in the desired position and the connection thereof to the shell. A particularly expedient reinforcement of the housing base is achieved with the aid of the first transverse strut. At the same time, the two anchoring sections are fixed in the relative arrangement thereof with respect to each other.

In one refinement, the reinforcing element has a rectangular frame, which is integrated into a floor of the housing base. The first transverse strut can form one side of the rectangular frame. In particular, the base can essentially have the shape of a rectangular half shell with a flat floor and at least two adjoining walls arranged substantially at right angles to the floor. The integration of a rectangular reinforcing element into the floor of the base leads to a particularly effective reinforcement of the housing base and of the entire belt lock housing.

In one refinement, fixing elements for a belt lock mechanism, which are accessible from an inner side of the housing base, are formed on the rectangular frame. The reinforcing element thereby serves not only for reinforcing the belt lock housing but at the same time provides a fixing option, which can be subjected to a particular loading, for the belt lock mechanism arranged in the belt lock housing.

In one refinement, the reinforcing element has reinforcing ribs which are arranged at right angles to a floor of the base and are arranged at a distance from the connecting pins. The reinforcing ribs can be arranged in particular on lateral walls of the housing base and can thereby protect the housing base and also the entire belt lock housing from undesirable deformation which could conflict in particular with a smooth-running actuation of an unlocking element. By means of the distance between the reinforcing ribs and the connecting pins, the reinforcing element all in all provides a hardly deformable, cage-like supporting structure.

In one refinement, the reinforcing ribs, together with a second transverse strut of the rectangular frame, form a U-shaped reinforcement of the housing base. The second transverse strut can be arranged parallel to the first transverse strut of the rectangular frame and, together with the reinforcing ribs, can form a stiffener, which is spaced apart from the connecting pins, for the housing base.

In one refinement, one of the reinforcing ribs is T-shaped in cross section, a crossbar of the T-shaped reinforcing rib being embedded in the shell, and a web of the T-shaped reinforcing rib projecting inwards out of the shell. The crossbar can be entirely or partially embedded in the shell. The reinforcing rib is thereby integrated particularly readily in the shell, and a particularly effective reinforcement is obtained.

In one refinement, one of the reinforcing ribs has a recess in an outer surface, in which the first plastic component engages. This measure leads to even better fixing of the reinforcing rib in the shell. In particular, shearing and tensile forces can be transmitted by the form-fitting engagement of the first plastic component in the recess of the reinforcing rib.

In one refinement, the first plastic component has polypropylene (PP). This material has expedient properties for the belt lock housing.

In one refinement, the second plastic component has a plastic material which is harder than the first plastic component, in particular polyamide (PA). A particularly effective reinforcement is thereby obtained.

Figure 2:
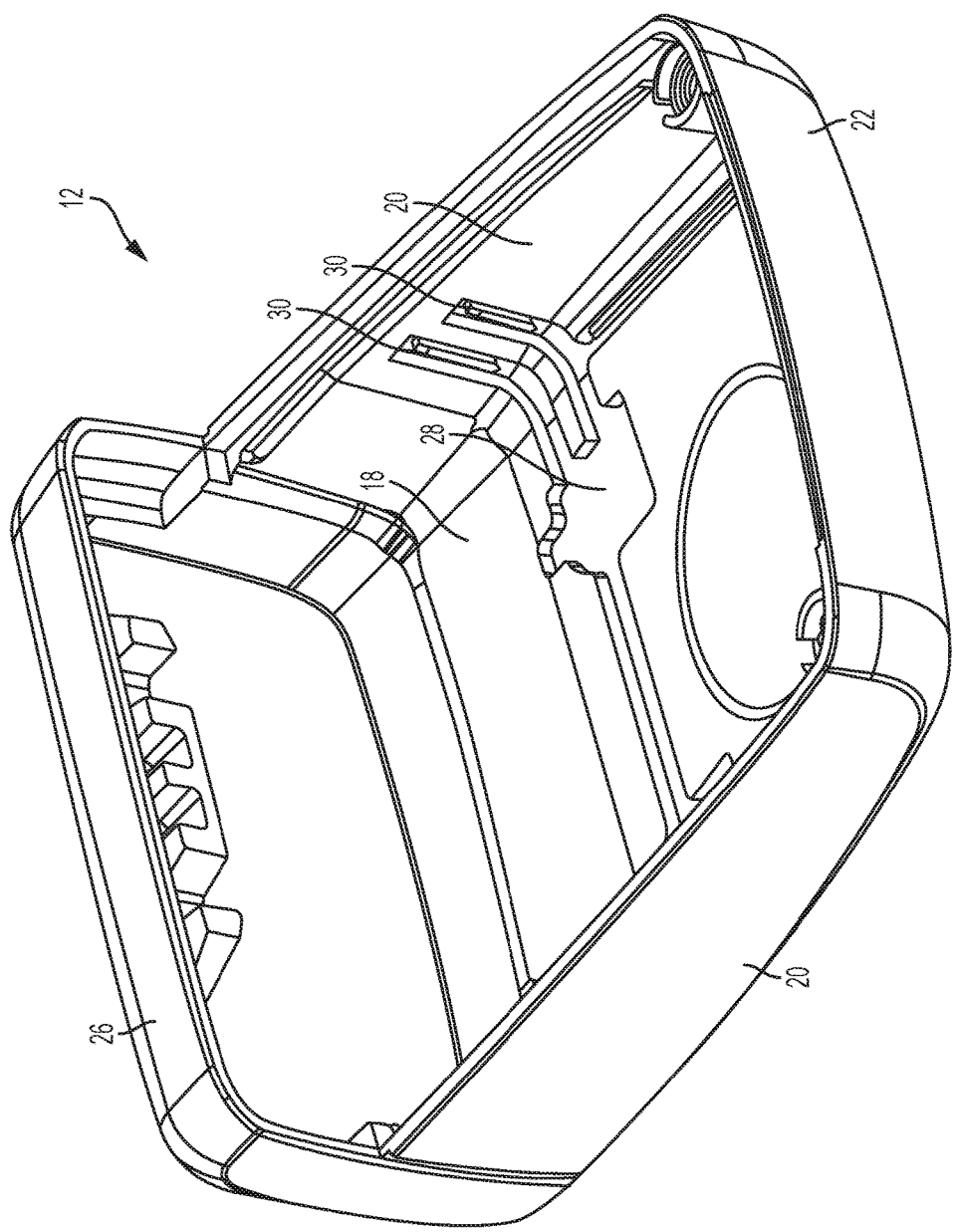
Figure 3:
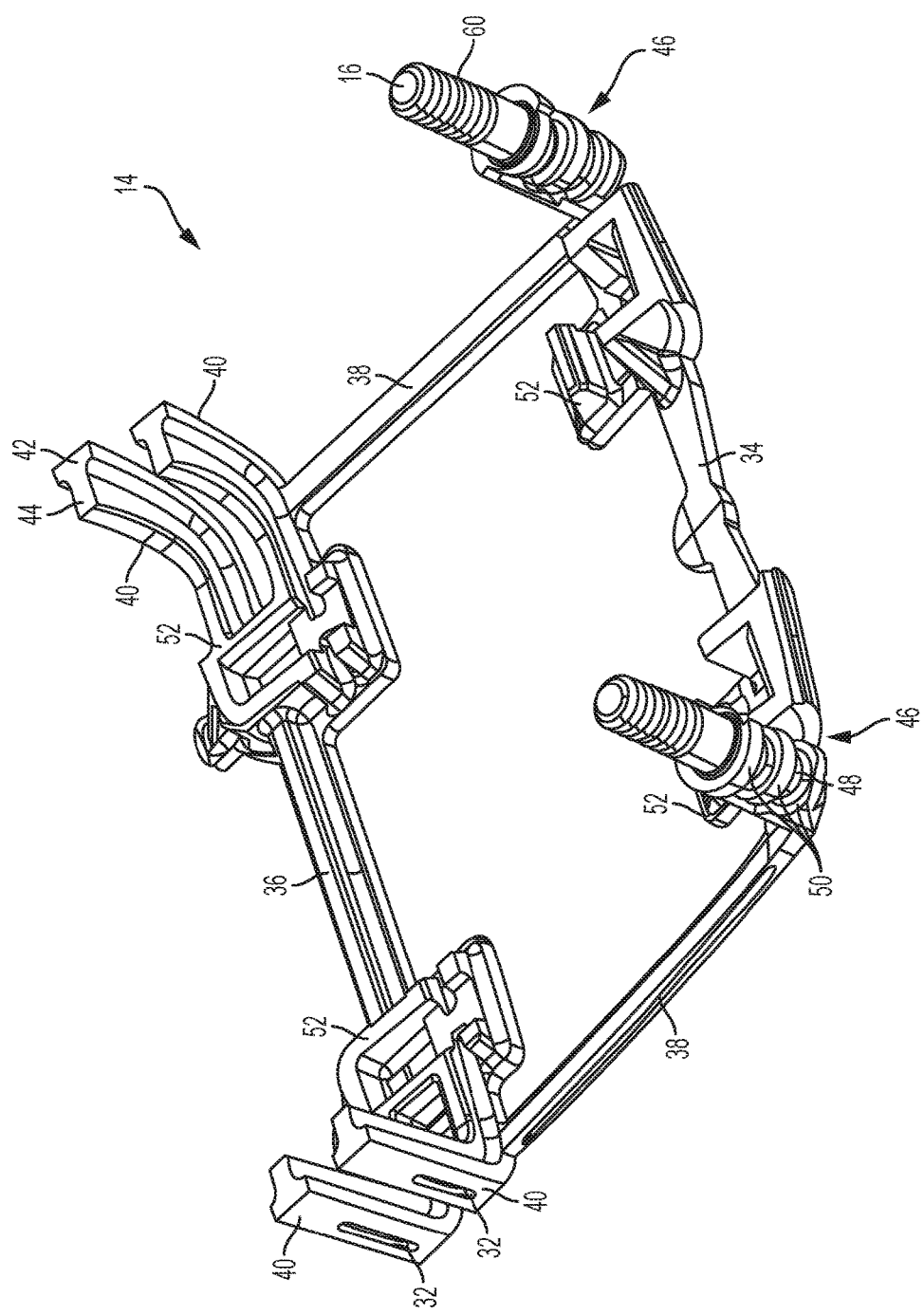
Figure 4:
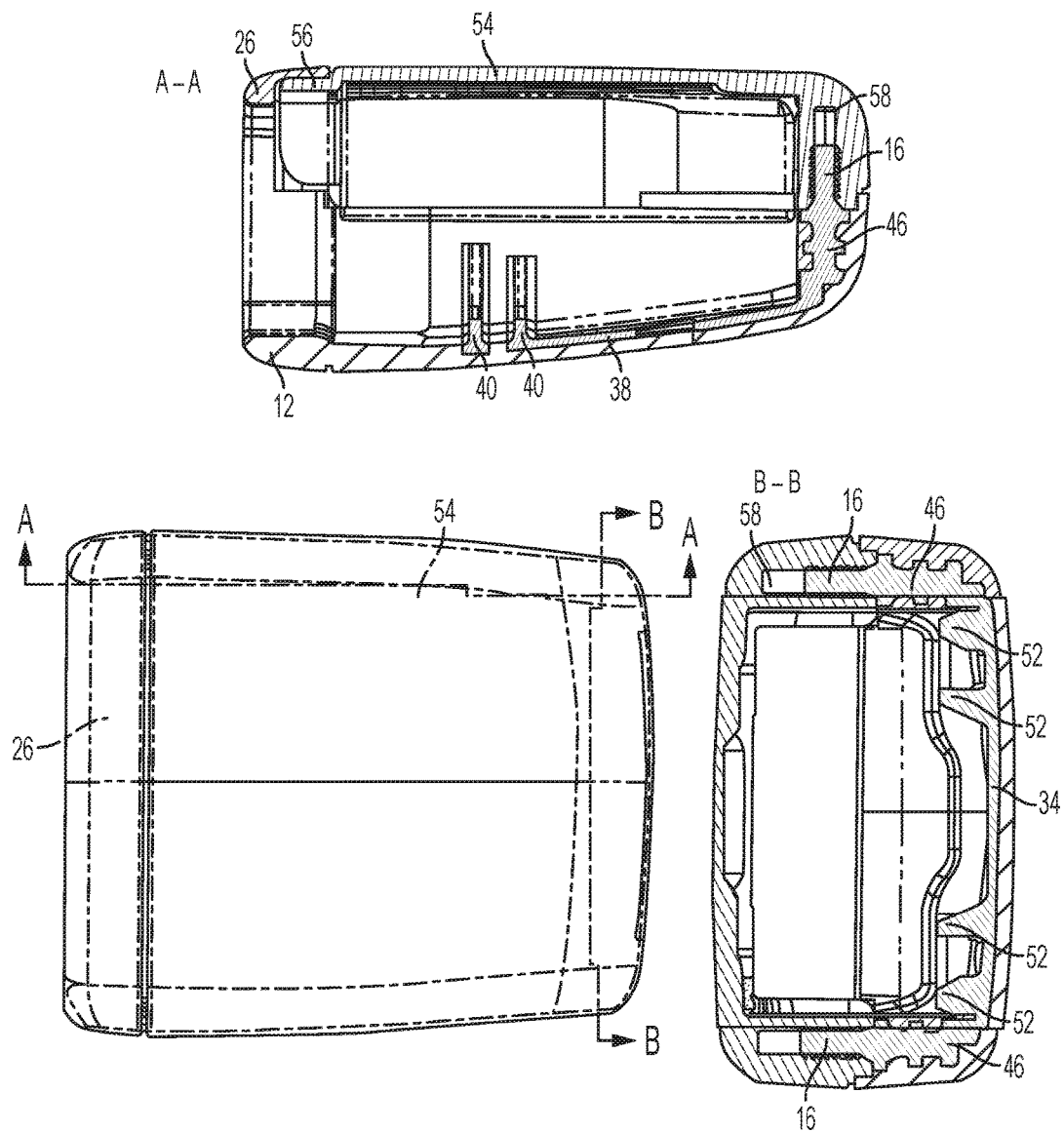

The invention is explained in more detail below with reference to an exemplary embodiment which is illustrated in the figures, in which:

FIG. 1 shows a housing base of a belt lock according to the invention in a perspective view, FIG. 2 shows the first plastic component of the housing base from FIG. 1, FIG. 3 shows the second plastic component of the housing base from FIG. 1, FIG. 4 shows the belt lock with the housing base from FIG. 1 and a housing cover in the fitted state, in a top view and in two sectional illustrations.

The housing base 10 from FIG. 1 has a shell 12 formed from a first plastic component, and a reinforcing element 14 which is connected thereto, is formed by a second plastic component and has two connecting pins 16. The shell 12 is composed of polypropylene and has the basic shape of a rectangular box with a substantially flat floor 18 and three side walls arranged substantially at right angles thereto. Two lateral side walls 20 are arranged opposite each other on the longitudinal sides of the rectangular floor 18. An opening 24 is opposite the rear side wall 22, which is arranged in between the two lateral walls, said opening being bounded downward by a front end of the floor 18 and upward by a bow-shaped section 26 of the shell.

That side of the belt lock housing which is opposite the floor 18 is closed by a housing cover, not illustrated in FIG. 1. It can already be surmised from FIG. 1 that said housing cover is inserted at one end under the bow-shaped section 26 of the shell 12 and is fixed at the other end with the aid of the two connecting pins 16.

When the housing cover is fitted, the reinforcing element 14 is not visible from the outside. It is arranged on the inner side of the shell 12. The connecting pins 16 project freely out of the shell 12 such that they can be pressed into receptacles of the housing cover.

Shell 12 and reinforcing element 14 are produced together in a two-component injection molding process and are connected non-detachably to each other. For illustrative purposes, FIGS. 2 and 3 nevertheless show the two plastic components separately from each other.

FIG. 2 shows the shell 12 from FIG. 1, with the features thereof which have already been explained not being discussed again. With the reinforcing element 14 notionally removed, it can be seen that the reinforcing element 14 is integrated in the floor 18 and in the lateral side walls 20 of the shell 12, and that the shell 12 has numerous cutouts for this purpose, in which the reinforcing element 14 is arranged. Said cutouts are shaped in a complementary manner to the reinforcing element 14. It is seen that the inner side of the shell 12 has, in the region of the floor 18 and of the lateral side walls 20, a depression 28 with a substantially uniform depth, in which the reinforcing element 14 is arranged.

The webs 30 which can be seen in the region of the lateral side wall 20, are formed within said depression 28 and project inward from a floor of the depression 28 such that they engage in complementarily shaped recesses 32 (see FIG. 3) of the reinforcing element 14 and bring about an additional form-fitting anchoring of the reinforcing element 14 can be seen.

Details of the reinforcing element 14 can best be seen in FIG. 3. The reinforcing element 14 has a rectangular frame with a first transverse strut 34, a second transverse strut 36 and two longitudinal struts 38 connecting the two transverse struts 34, 36 at the two ends. Two reinforcing ribs 40 which are arranged substantially at right angles to the plane of the rectangular frame are arranged in each case at the two ends of the second transverse strut 36. A respective recess 32 is arranged on the outer sides of said reinforcing ribs 40. The reinforcing ribs 40, together with the second transverse strut 36, form a U-shaped stiffener of the housing base.

The reinforcing ribs 40 are in each case T-shaped in cross section with a crossbar 42 and a web 44. The crossbars 42 of the reinforcing ribs 40 are arranged in the depression of the shell 12 and are thereby embedded in the first plastic component. The webs 44 of the reinforcing ribs project out of the inner side of the shell 12.

The first transverse strut 34 connects the two anchoring sections 46 to each other. The latter are in each case arranged in an extension of one of the connecting pins 16 and have a shank 48 with a plurality of spaced-apart longitudinal sections 50 having a widened diameter. The connecting pins 16 in each case have a toothing 60.

A plurality of fixing elements 52, which face into the interior of the shell 12 and are intended for a belt lock mechanism, project from the rectangular frame, more precisely, in the example, from the first transverse strut 34 and the second transverse strut 36. Said fixing elements 52 together form four loadable connecting points for the belt lock mechanism, which connecting points are accessible from an inner side of the shell 12.

FIG. 4 illustrates the fitted state of the belt lock housing. The top view, which is illustrated at the bottom on the left, shows the housing cover 54 and the bow-shaped section 26 of the shell 12. Furthermore, the figure serves for illustrating the sectional illustrations: a sectional illustration along the section plane identified by A-A in the top view is located above the top view; a view along the section plane identified by B-B is located on the right thereof.

It is seen in the illustration of the section plane A-A that a front end of the housing cover 54 has a fixing section 26 which is arranged under the bow-shaped section 26 of the shell 12. A receptacle 58 in the form of a bore in the manner of a blind hole is seen at the other end of the housing cover 54. The connecting pin 16 is pressed into said bore by the toothing 60 and is therefore fixed frictionally therein.

An anchoring section 46 which is anchored in a form-fitting manner in the first plastic component of the shell 12 can be seen as an extension of the connecting pin 16. In addition, a longitudinal strut 38 is seen, said longitudinal strut being arranged in a depression on the inner side of the shell 12 and leading from the anchoring section 46 as far as the reinforcing ribs 40, from which a transition region to the second transverse strut 36 is arranged in the section plane. The reinforcing ribs 40 are also T-shaped in cross section in this region.

The section plane B-B likewise shows the frictional anchoring of the connecting pins 16 in the receptacles 58 of the housing cover 54. In addition, the first transverse strut 34 and the fixing elements 52, which project inward therefrom and are intended for a belt lock mechanism (not illustrated) are seen.

The invention claimed is:

1. A belt lock housing having a housing cover, a housing base and a plurality of connecting pins, which pins are fixed in receptacles in the housing cover, wherein the housing base is produced in a two-component injection molding process and has a first plastic component, which forms a shell of the housing base, and a second plastic component, which forms a reinforcing element of the housing base having the connecting pins, wherein at least one of:
   the second plastic component comprises a material that is harder than the first plastic component;
   the first plastic component and the second plastic component comprise different materials; or
   the second plastic component has portions located away from the pins that are monolithic with the pins.

2. The belt lock housing as claimed in claim 1, wherein, for each of the connecting pins, the reinforcing element has an anchoring section which is arranged in an extension of the respective connecting pin and which is held in a form-fitting manner in the shell.

3. The belt lock housing as claimed in claim 2, wherein the anchoring section has a shank with at least one longitudinal section having widened cross-sectional dimensions.

4. The belt lock housing as claimed in claim 1, wherein the reinforcing element has a first transverse strut, which connects two of the anchoring sections to each other.

5. The belt lock housing as claimed in claim 1, wherein the reinforcing element has a rectangular frame, which is integrated into a floor of the housing base.

6. The belt lock housing as claimed in claim 5, wherein fixing elements for a belt lock mechanism, which are accessible from an inner side of the housing base, are formed on the rectangular frame.

7. The belt lock housing as claimed in claim 1, wherein the reinforcing element has reinforcing ribs which are arranged at right angles to a floor of the housing base and are arranged at a distance from the connecting pins.

8. The belt lock housing as claimed in claim 7, wherein the reinforcing ribs, together with a second transverse strut of the rectangular frame, form a U-shaped stiffener of the housing base.

9. The belt lock housing as claimed in claim 7, wherein one of the reinforcing ribs is T-shaped in cross section, a crossbar of the T-shaped reinforcing rib being embedded in the shell, and a web of the T-shaped reinforcing rib projecting inwards out of the shell.

10. The belt lock housing as claimed in claim 7, wherein one of the reinforcing ribs has a recess in an outer surface, in which the first plastic component engages.

11. The belt lock housing as claimed in claim 1, wherein the first plastic component has polypropylene.

12. The belt lock housing as claimed in claim 1, wherein the second plastic component comprises the material that is harder than the first plastic component, the second material being polyamide.

13. The belt lock housing as claimed in claim 1, wherein the second plastic component comprises the material that is harder than the first plastic component.

14. The belt lock housing as claimed in claim 1, wherein the first plastic component and the second plastic component comprise different materials.

15. The belt lock housing as claimed in claim 1, wherein the first plastic component comprises polypropylene and the second plastic component comprises polyamide.

16. The belt lock housing as claimed in claim 1, wherein the second plastic component has the portions located away from the pins that are monolithic with the pins.

17. A belt lock housing, comprising:
a housing cover; and
a housing base,
wherein
the housing base comprises a first plastic component, which forms a shell of the housing base, and a second plastic component, which forms a monolithic reinforcing element of the housing base,
the reinforcing element includes connecting pins,
the housing cover is coupled with the housing base by way of the connecting pins, and
the first plastic component and the second plastic component are produced together in a two-component injection molding process.

18. The belt lock housing as claimed in claim 17, wherein each connecting pin has a shank with at least one longitudinal section having a widened cross-sectional dimension.

19. The belt lock housing as claimed in claim 17, wherein at least one of:
the second plastic component comprises a material that is harder than the first plastic component; or
the first plastic component and the second plastic component comprise different materials.

20. A belt lock housing, comprising:
a housing base comprising a shell and a reinforcing element; and
a housing cover,
wherein
the reinforcing element includes connecting pins,
the housing cover is coupled with the housing base by way of the connecting pins,
the shell and the reinforcing element are produced in a two-component injection molding process, and
the reinforcing element has reinforcing ribs arranged at right angles to a floor of the housing base that, together with transverse strut, form a U-shaped stiffener of the housing base.

21. The belt lock housing as claimed in claim 20, wherein at least one of the reinforcing ribs is (1) T-shaped in cross section, (2) at least one of the reinforcing ribs is T-shaped in cross section and a crossbar of the at least one T-shaped reinforcing rib is embedded in the shell, or (3) at least one of the reinforcing ribs has a recess engaged with the shell.

* * * * *